US009549183B2

United States Patent
Liao et al.

(10) Patent No.: US 9,549,183 B2
(45) Date of Patent: Jan. 17, 2017

(54) METHOD AND DEVICE FOR ESTIMATING VIDEO QUALITY ON BITSTREAM LEVEL

(75) Inventors: Ning Liao, Beijing (CN); Xiao Dong Gu, Beijing (CN); Zhibo Chen, Beijing (CN); Kai Xie, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 289 days.

(21) Appl. No.: 14/116,342

(22) PCT Filed: May 12, 2011

(86) PCT No.: PCT/CN2011/000832
§ 371 (c)(1),
(2), (4) Date: Nov. 7, 2013

(87) PCT Pub. No.: WO2012/151719
PCT Pub. Date: Nov. 15, 2012

(65) Prior Publication Data
US 2014/0219350 A1    Aug. 7, 2014

(51) Int. Cl.
*H04N 19/107* (2014.01)
*H04N 19/89* (2014.01)
*H04N 19/513* (2014.01)
*H04N 19/154* (2014.01)
*H04N 19/895* (2014.01)

(52) U.S. Cl.
CPC ...... *H04N 19/00939* (2013.01); *H04N 19/107* (2014.11); *H04N 19/154* (2014.11); *H04N 19/513* (2014.11); *H04N 19/895* (2014.11)

(58) Field of Classification Search
CPC .......................... H04N 19/513; H04N 19/107
See application file for complete search history.

(56) References Cited

U.S. PATENT DOCUMENTS 6,421,386 B1 * 7/2002 Chung ................... H04N 19/00
                                              375/240.24
2003/0012280 A1 * 1/2003 Chan .................... H04N 19/895
                                              375/240.16
(Continued)

FOREIGN PATENT DOCUMENTS

CN       101019437       8/2007
CN       101102511       1/2008
(Continued)

OTHER PUBLICATIONS

Amy R. Reibman, Vinay A. Vaishampayan and Yegnaswamy Sermadevi "Quality monitoring of video over a packet network", IEEE Transactions on Multimedia, 6(2),pp. 327-334.
(Continued)

*Primary Examiner* — William C Vaughn, Jr.
*Assistant Examiner* — Jerry Jean Baptiste
(74) *Attorney, Agent, or Firm* — Brian J. Dorini; Lily Neff (57) ABSTRACT

A method for estimating video quality on bit-stream level, wherein the video quality refers to a video after error concealment and the method is performed on bit-stream level before said error concealment, comprises extracting and/or calculating a plurality of global condition features from a video bit-stream, extracting and/or calculating a plurality of local effectiveness features at least for a lost MB, calculating a numeric error concealment effectiveness level for each (or at least for each lost) MB by emulating an error concealment method that is used in said error concealment, and providing the calculated error concealment effectiveness level as an estimated visible artifacts level of video quality.

26 Claims, 2 Drawing Sheets

(56) References Cited

U.S. PATENT DOCUMENTS

| | | | |
|---|---|---|---|
| 2006/0013320 A1* | 1/2006 | Oguz | H04N 19/61 375/240.27 |
| 2009/0153668 A1* | 6/2009 | Kim | H04N 17/004 348/180 |
| 2009/0244289 A1 | 10/2009 | Raake et al. | |
| 2009/0323826 A1* | 12/2009 | Wu | H04N 19/895 375/240.27 |
| 2010/0008425 A1* | 1/2010 | Yamada | H04N 17/004 375/240.16 |
| 2012/0236942 A1* | 9/2012 | Lin | H04N 19/52 375/240.16 |

FOREIGN PATENT DOCUMENTS

| | | |
|---|---|---|
| CN | 101227619 | 7/2008 |
| CN | 101895769 | 11/2010 |

OTHER PUBLICATIONS

Hua-Xia Rui, Chong-Rong Li, and Sheng-Ke Qiu "Evaluation of packet loss impairment on streaming video", vol. 7, pp. 131-136, Jan. 2006.

Toru Yamada, Yoshihiro Miyamoto, and Masahiro Serizawa "No-reference video quality estimation based on error-concealment effectiveness".pp. 288-293.

Search Report Feb. 23, 2012.

Lin et al., "A Versatile Model for packet Loss Visibility and its Application to packet Prioritization", Image Processing, IEEE Transactions on (vol. 19, Issue: 3), Mar. 1, 2010, pp. 722-735.

Reibman et al., "Predicting packet-loss visibility using scene characteristics", IEEE Packet Video 2007, Nov. 1, 2007, pp. 308-317.

Winkler et al., "The Evolution of Video Quality Measurement: From PSNR to Hyprid Metrics", Transactions on Broadcasting, IEEE (vol. 54, Issue: 3), Nov. 1, 2007, pp. 660-668.

* cited by examiner

| (n-1,i-1, j-1) | (n-1,i, j-1) | (n-1,i+1, j-1) |
|---|---|---|
| (n-1,i-1, j) | (n-1,i,j) | (n-1,i+1, j) |
| (n-1,i-1, j+1) | (n-1,i, j+1) | (n-1,i+1, j+1) | a)

| (n,i-1, j-1) | (n,i, j-1) | (n,i+1, j-1) |
|---|---|---|
| (n,i-1, j) | (n,i,j) | (n,i+1, j) |
| (n,i-1, j+1) | (n,i, j+1) | (n,i+1, j+1) | b)

| (n+1,i-1, j-1) | (n+1,i, j-1) | (n+1,i+1, j-1) |
|---|---|---|
| (n+1,i-1, j) | (n+1,i,j) | (n+1,i+1, j) |
| (n+1,i-1, j+1) | (n+1,i, j+1) | (n+1,i+1, j+1) | c)

METHOD AND DEVICE FOR ESTIMATING VIDEO QUALITY ON BITSTREAM LEVEL

This application claims the benefit, under 35 U.S.C. §365 of International Application PCT/CN2011/000832, filed May 12, 2011, which was published in accordance with PCT Article 21(2) on Nov. 15, 2012 in English.

FIELD OF THE INVENTION

This invention relates to a method and a device for estimating perceived video quality, in particular on bitstream level before video decoding.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Video delivery over IP network is unreliable. A requirement for VQM (video quality modeling) is to rate the quality degradation caused by IP transmission impairment (e.g. packet loss, delay, jitter), in addition to those caused by video compression. The artifacts are evaluated after applying error concealment (EC) at the decoder, since the result should relate to the video quality perceived by a viewer. The goal of EC is to estimate missing macroblocks (MBs) that arise from bit-erasure or packet loss, in order to provide a minimum degree of perceptual quality degradation. Thus, accurate prediction of the EC effectiveness is a fundamental part of VQM measuring transmission impairment.

EC methods are either spatial (i.e., bilinear interpolation, mainly for I-frames) or temporal (i.e., estimation of lost motion vectors (MV), mainly for B- and P-frames). VQM technologies can be categorized into packet-layer model, bitstream-level model, media level model and hybrid model. ITU-T SG12/Q14 considers a bitstream-level no-reference video quality (VQ) assessment model to predict the impact of observed coding and IP network impairments on quality in mobile streaming and IPTV applications. It predicts a Mean Opinion Score (MOS) using the bitstream information, and information contained in packet headers, prior knowledge about the media stream and buffering information from the client. H. Rui, C. Li, and S. Qiu in "Evaluation of packet loss impairment on streaming video", J. Zhejiang Univ.-Sci. A, Vol. 7, pp. 131-136 (January 2006) propose a VQM model that uses strong spatial discontinuities as hints of packet loss, and is based on decoded pixel information. However, this information is not available on bitstream-level.

T. Yamada, Y. Miyamoto, and M. Serizawa in "No-reference video quality estimation based on error-concealment effectiveness", Packet Video, 288-293, (2007) describe a no-reference hybrid VQM using both bitstream-level information and the decoded pixel information. It maps the number of MBs for which the error concealment is determined as ineffective to a MOS value.

A problem with the above methods is that they do not work well when a lost MB is not stationary, which happens quite often in realistic video sequences.

A. R. Reibman, V. A. Vaishampayan and Y. Sermadevi in "Quality monitoring of video over a packet network", IEEE Transactions on Multimedia, 6(2), 327-334, (2004) use a no-reference bitstream-level VQM to estimate MSE (Mean Squared Error) of an EC video sequence in case of transmission impairment. Estimates of some statistical parameters from the received video bitstream on a macroblock basis (such as DC and AC components of DCT of I-frame MBs, the motion vectors of P- and B-MBs) are used. One problem of this model is that it uses MSE (mean squared error) as target visual quality metric, instead of the subjective MOS. It is well known that MSE is not a good metric for subjective video quality, especially for measuring quality degradation caused by transmission impairment.

SUMMARY OF THE INVENTION

Visible artifacts produced by pixel interpolation based EC schemes and by MV estimation based EC schemes are very different. Generally, the spatial approach produces blurred estimates of a missing MB, while the temporal approach produces edge artifacts that may be less disturbing or invisible.

The present invention provides a bitstream-level EC effectiveness rating method, which is a fundamentally important part of the bitstream-level VQM model, and a corresponding device. The method and device are usable at least for non-reference VQM measuring of perceptual video quality degradation caused by network transmission impairment in general. In particular, the method and device are advantageous in the case of Internet Protocol (IP) network transmission impairment.

According to the invention, a scheme for rating a visible artifacts level reflecting the EC effectiveness comprises extracting a plurality of local features (also called effectiveness features herein) and a plurality of global features (also called condition features herein) of the coded video at bitstream-level, and calculating a numeric level of the EC effectiveness by emulating the process of the specific error concealment method used at decoder.

The plurality of effectiveness features are e.g. from the group of spatial motion homogeneity, temporal motion consistence, texture smoothness, and the probabilities of one or more special encoding modes. In one embodiment, three effectiveness features are extracted, namely spatial motion homogeneity, temporal motion consistence and texture smoothness.

The plurality of condition features are global features of each frame, as calculated is from the received bitstream. They serve as a condition to determine or estimate which type of EC method is used for a frame after transmission losses. Exemplary condition features are frame type, ratio of intra-MB/inter-MB, motion index and texture index. A texture index may be based on any known texture analysis method, e.g. a comparing a DC coefficient and/or selected AC coefficients with thresholds. In one embodiment, are all four of these condition features are extracted, or calculated respectively.

All the used features are based on data that are extracted from the coded video at bitstream-level, i.e. without decoding the bitstream to the pixel domain. This has the advantage that the computational complexity of the video quality assessment mode is kept lower because the complex video decoding process is not involved, only video syntax parsing is required; meanwhile the video quality prediction accuracy of model is improved because video content feature, coding feature and decoder feature are taken into consideration.

Another advantage is that the result is independent from the actually used decoder, and therefore objective, so that various results are comparable.

In one embodiment, the spatial motion homogeneity that is calculated for a lost or incorrect MB is obtained from MVs of adjacent correct MBs. In one embodiment, the temporal motion consistence is obtained from MV uniformity. In one embodiment, the texture smoothness is calculated, only for I-frames, from DCT coefficients of adjacent MBs. In one embodiment, inter-skip mode ratio and/or inter-direct mode ratio for a MB are based on data from 4×4 blocks of adjacent MBs.

In one embodiment, a method for estimating video quality, the video quality referring to a video after error concealment (EC) and the method being performed on bit-stream level before said EC, comprises steps of
extracting and/or calculating a plurality of global condition features from a video bit-stream,
determining that a macroblock (MB) is lost,
extracting and/or calculating a plurality of local effectiveness features at least for the lost MB,
calculating a numeric EC effectiveness level for each (or at least each lost) MB by emulating an EC method that is used in said EC, and
providing the calculated EC effectiveness level as an estimated visible artifacts level of video quality.

In one embodiment, a device for estimating video quality, the video quality referring to a video after error concealment and being estimated on bit-stream level before said error concealment, comprises
first extracting and calculating means for extracting and calculating a plurality of global condition features from a video bit-stream,
determining means for determining that a MB is lost,
second extracting and calculating means for extracting and calculating a plurality of local effectiveness features at least for the lost MB,
calculating means for calculating a numeric EC effectiveness level for each (or at least each lost) MB by emulating an error concealment method, and
output means for providing the calculated error concealment effectiveness level as an estimated visible artifacts level of video quality.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an overview of VQMs and artifacts types.

DETAILED DESCRIPTION OF THE INVENTION

Figure 1:
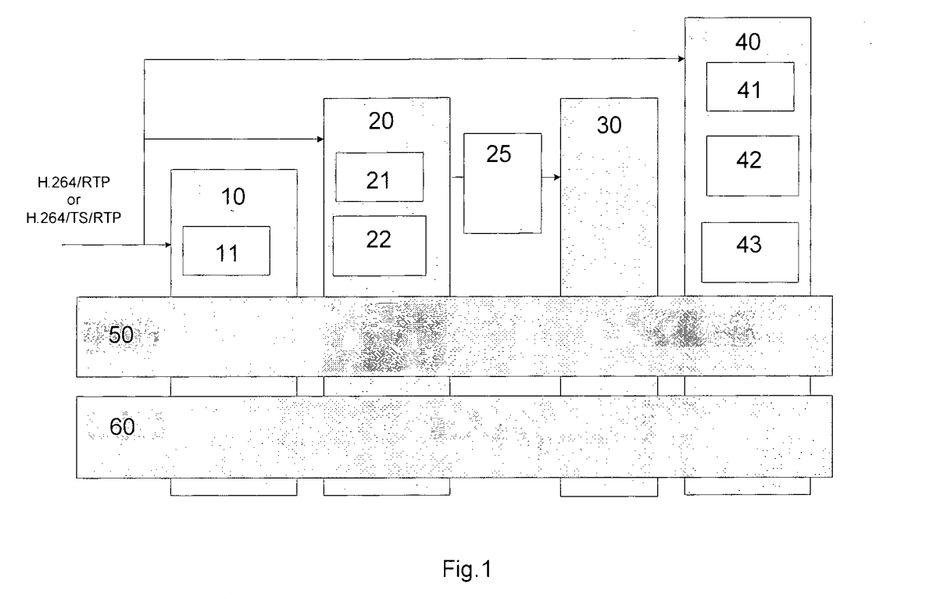

Video communication over wired and wireless IP network (e.g. IPTV service) has become very popular. Compared with traditional video transmission over cable network, video delivery over IP network is much less reliable. The situation is even worse in the environment of wireless networks. Correspondingly, it is desirable for video quality modeling (VQM) to rate the quality degradation caused by IP transmission impairment (e.g., packet loss, delay, jitter), in addition to those caused by video compression. As shown in FIG. 1, there are two categories of visible artifacts resulting respectively from transmission and video coding: transmission impairment/network impairment 50 and coding artifacts 60.

Compared with VQM measuring coding artifacts only, one challenge that is special to VQM measuring perceptual artifacts caused by network impairment is to evaluate the artifacts after applying error concealment at the decoder. When some parts of the coded video bitstream are lost during network transmission, the decoder will adopt error concealment (EC) methods to conceal the lost parts in an effort to reduce the perceptual video quality degradation. The less visible the concealed loss artifact is, the more effective is the EC method. The EC effectiveness depends heavily on video content features. The rating of EC effectiveness determines the initial visible artifact (IVA) level when a packet loss occurs. Further, the IVA will propagate spatio-temporally to the areas that use it as reference in predictive video coding framework, like H.264, MPEG-2, etc. In summary, the accurate prediction of the EC effectiveness is a fundamental part of VQM measuring transmission impairment. According to the input information available to the VQM, the VQM technologies can be categorized into packet-layer model 10, bitstream-level model 20, media level model 30 and hybrid model 40.

The packet-layer model 10 includes a demultiplexer and de-packetizer 11. The bitstream-level model 20 includes also a demultiplexer and de-packetizer 21, but additionally also a syntax parser 22 for coded video bitstreams. Both models consider the video signal before it enters a video decoder 25. The video decoder 25 usually includes or is combined with an EC unit. Therefore packet-layer models 10 and bitstream-level models 20 have to estimate the effect of the EC unit when assessing video quality as perceived by the viewer. On the other hand, media level models 30 and hybrid models 40 are used after video decoding and EC unit 25. The hybrid VQM 40 also includes a demultiplexer and de-packetizer 41, a parser 42 for coded video bitstreams and a video decoder 43 including an EC unit. The above-mentioned bitstream-level video quality assessment model considered by P.NBAMS (ITU-T SG12/Q14) is a light-weight model, as compared e.g. to a media-layer model 30, and is suitable for real-time monitoring and for easy deployment in customer devices like STBs or home gateways. The bitstream-level EC effectiveness rating method described below is an important part of the bitstream-level VQM model 20.

When parts of the coded video bitstream are lost during network transmission, the decoding and EC unit 25 will adopt EC to conceal the lost parts. The degree of artifact produced by packet loss depends heavily on the employed EC scheme. The goal of EC is to estimate the pixels of the missing macroblocks (MBs) in a compressed video stream that are caused by bit-erasure or packet loss, in order to provide a minimum degree of perceptual quality degradation. Commonly, EC methods roughly fall into two categories: spatial and temporal. In the spatial category, spatial correlation between local pixels is exploited; missing MBs are recovered by interpolation techniques from neighbor pixels. In the temporal category, both the coherence of motion field and the spatial smoothness of pixels along edges cross block boundary are exploited to estimate motion vector (MV) of a lost MB. For example, in the H.264 JM reference decoder, the spatial approach is applied to guess lost MBs of Intra-coded frames (I-frames) by using a bilinear interpolation technique. The temporal approach is applied to guess lost MBs for inter-predicted frames (P-frames, B-frames) by estimating MVs of lost MBs from MVs of neighboring MBs. A boundary-matching criterion is used to select the best MV estimate.

Visible artifacts produced by pixel interpolation based EC scheme and by motion vector estimation based EC scheme are very different. Generally, the spatial approach produces blurred estimates of a missing MB, while the temporal approach produces edge artifacts if a guessed MV is not accurate. In some other cases the temporal approach produces almost no visible artifacts.

Figure 2:
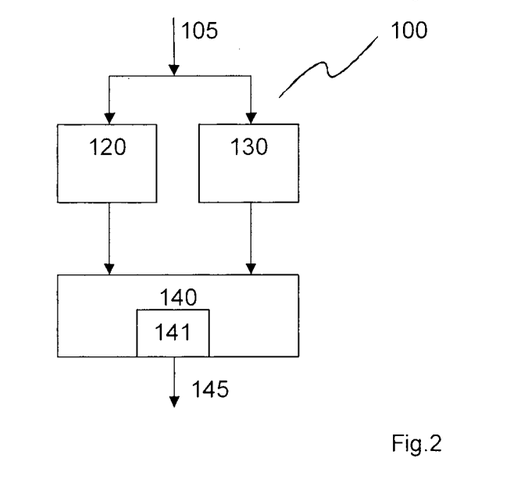
FIG. 2 a block diagram of the proposed scheme.

A block diagram of the disclosed scheme for rating visible artifacts while reflecting the EC effectiveness is shown in FIG. 2. An input signal 105 is provided to two feature extraction units 120,130. In a local feature extraction unit 120, at least two local features, which reflect the effectiveness of the EC method, are extracted and/or calculated for each (or at least for each lost) MB, based on the received bitstream information. In a global feature extraction unit 130, at least two global features of each frame are extracted and/or calculated from the received bitstream, and are used as condition to determine which type of EC method is used for the frame having a transmission loss. Finally, a numeric visible artifacts level of EC effectiveness is obtained in an EC effectiveness estimation unit 140 for each (or at least for each lost) MB, by emulating the pre-known EC method employed at the decoder. The output is a visible artifacts level value 145 that reflects the EC effectiveness. The EC method employed at the decoder can be obtained through any method, e.g. by automatic detection, manual input, pre-programming etc. It may also be provided directly or indirectly by the decoding and EC unit 25.

Figure 3:
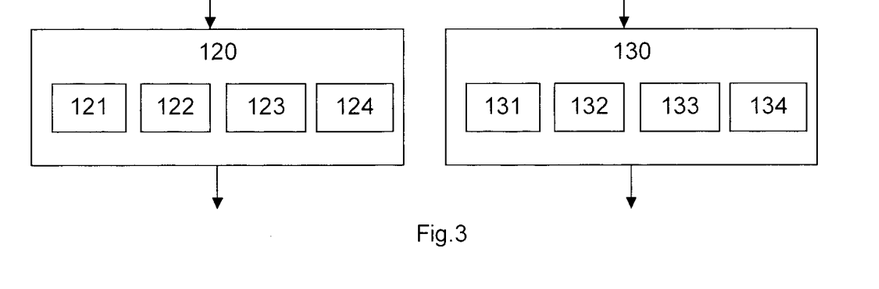
FIG. 3 block diagrams of the extraction of EC effectiveness features and of the extraction of condition features.

FIG. 3 shows exemplary embodiments of the local feature extraction unit 120 and the global feature extraction unit 130.

In one embodiment, the local feature extraction unit 120 comprises three subunits 121-123 for assessing different effectiveness features, namely a first subunit 121 for calculating spatial MV homogeneity, a second subunit 122 for calculating temporal MV uniformity, a third subunit 123 for calculating MV magnitude, and a fourth subunit 124 for calculating texture smoothness. Additionally (not shown), there may be one or more further subunits for calculating a probability of certain modes, such as inter_skip mode and/or inter_direct mode.

In one embodiment, the global feature extraction unit 130 comprises four subunits 131-134 for assessing different condition features, namely a frame type determining subunit 131, an intra-/inter ratio detection subunit 132, a motion index determining subunit 133 and a texture index determining subunit 134.

In the following description of the subunits, a frame index is denoted as n and the coordinate of a MB in the frame as (i,j). For a lost MB (i,j) in frame n, the condition features for the frame n and the local features for the MB (i,j) are calculated. In one embodiment, the condition features are calculated before the local features. In the following, subunits of the local feature determining unit 120 are described, see FIG. 3.

The spatial homogeneity determining unit 121 calculates spatial MV homogeneity. In one embodiment, two separate parameters for spatial uniformity are calculated in x direction and in y direction.

spatialuniformMV$_x$(n,i,j)=standardvariance{mv$_x$(n,i−1,j−1),mv$_x$(n,i,j−1),mv$_x$(n,i+1,j−1),mv$_x$(n,i−1,j),mv$_x$(n,i+1,j),mv$_x$(n,i−1,j+1),mv$_x$(n,i,j+1),mv$_x$(n,i+1,j+1)} spatialuniformMV$_y$(n,i,j)=standardvariance{mv$_y$(n,i−1,j−1),mv$_y$(n,i,j−1),mv$_y$(n,i+1,j−1),mv$_y$(n,i−1,j),mv$_y$(n,i+1,j),mv$_y$(n,i−1,j+1),mv$_y$(n,i,j+1),mv$_y$(n,i+1,j+1)}

Figure 4:
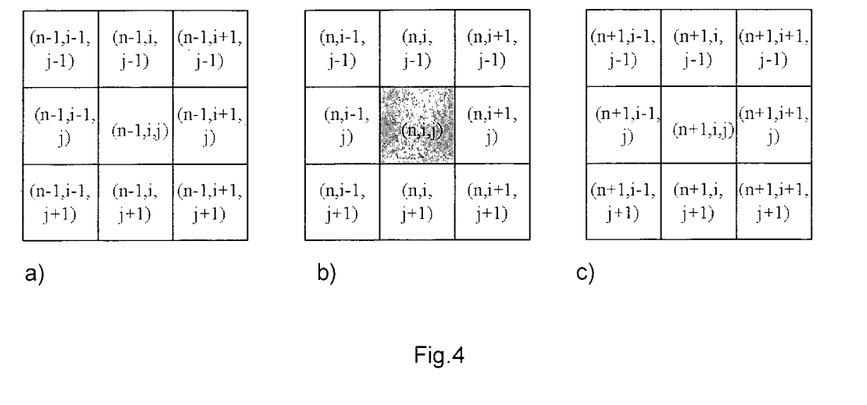
FIG. 4 a lost MB and its neighbor MBs.

FIG. 4b) shows a portion of a current video frame n with a lost MB (n,i,j). FIG. 4a) shows the same portion of the previous video frame n−1 and FIG. 4c) of the next video frame n+1. As long as any of the eight MBs around the lost MB (n,i,j) is received or recovered, its motion vector, if existing, is used to calculate the spatial MV homogeneity. If there is no available neighbor MB, the spatial MV uniformity is set to that of the collocated MB in the previous reference frame (i.e., P-frame or reference B-frame in hierarchical H.264 coding). For H.264 video encoder, one MB may be partitioned into sub-blocks for motion estimation. Thus, in case of an H.264 encoder, the sixteen motion vectors of the 4×4-sized blocks of a MB instead of one motion vector of a MB may be used in the above equation. Each motion vector is normalized by the distance from the current frame to the corresponding reference frame. This practice is applied also in the following calculations that involve the manipulation of motion vectors. The smaller the standard variance of the neighbor MVs is, the more homogeneous is the motion of these MBs. In turn, the lost MB is more probable to be concealed without visible artifacts if a certain type of motion-estimation based temporal EC method is applied here. This feature is applicable to lost MBs of inter-predicted frames like P-frames and B-frames. For B-frames, there maybe two motion fields, forward and backward. Spatial uniformity is calculated in two directions respectively.

The temporal uniformity determining unit 122 calculates temporal MV uniformity. In one embodiment, two separate parameters for temporal uniformity are calculated in x direction and in y direction:

temporaluniformMV$_x$(n,i,j)=standardvariance{(mv$_x$(n+1,i′,j′)−mv$_x$(n−1,i′,j′))|(i′,j′)∈{nine temporally neighbor MBs' locations}} temporaluniformMV$_y$(n,i,j)=standardvariance{(mv$_y$(n+1,i′,j′)−mv$_y$(n−1,i′,j′))|(i′,j′)∈{nine temporally neighbor MBs' locations}}

The temporal MV uniformity is calculated as the standard variance of the motion difference between the collocated MBs in adjacent frames, as shown in FIG. 4. The smaller the standard variance is, the more uniform is the motion of these MBs in temporal axis, and in turn, the lost MB is more probable to be concealed without visible artifacts if the motion projection based temporal EC method is applied here. This feature is applicable to lost MBs of both Intra frame (e.g. I_frame) and inter-predicted frame (e.g. P_frame and/or B_frame).

If one of the adjacent frames (e.g., frame n+1) is an Intra frame where there is no MV available in the coded bitstream, the MVs of the spatially adjacent MBs (i.e., (n, i±1, j±1) as shown in FIG. 4b)) of the lost MB and those of the temporally adjacent MBs of an inter-predicted frame (i.e. frame n−1 and/or n+1) are used to calculate temporal MV uniformity. That is, temporaluniformMV$_x$(n,i,j)=standardvariance{(mv$_x$(n,i′,j′)−mv$_x$(n−1,i′,j′))|(i′,j′)∈{eight neighbor MBs' locations}} temporaluniformMV$_y$(n,i,j)=standardvariance{(mv$_y$(n,i',j')−mv$_y$(n−1,i',j'))|(i',j')∈{eight neighbor MBs' locations}}

The MV magnitude determining unit 123 calculates MV magnitude. For the simple zero motion copy based EC scheme, the larger the MV magnitude is, the more probable to be visible is the loss artifact. In one embodiment, the average of motion vectors of neighbor MBs and current MB (if not lost) are calculated. That is, averagemagnitudeMV(n,i,j)=average{$^2\sqrt{(mv_x(n,i',j'))^2+(mv_x(n,i',j'))^2}$|(i',j')∈{nine temporally neighbor MBs' locations}}

In another embodiment, the magnitude of the median value of the motion vectors of neighbor MBs is used as the motion magnitude of the lost current MB. If the lost current MB has no neighbor MBs, the motion magnitude of the lost current MB is set to that of the collocated MB in the previous frame.

The texture smoothness determining unit 124 calculates texture smoothness. In one embodiment, the following method is used.

For the I-frame, the texture smoothness of correctly received MB is calculated using its DCT coefficients according to $$texturesmoothness(n, i, j) = \begin{cases} 0, & \text{if } \frac{(coeff_0)^2}{\sum_{k=0}^{M-1}(coeff_k)^2} > T, \text{ or, } \sum_{k=0}^{M-1}(coeff_k)^2 = 0 \\ \left(\sum_{k=1}^{M-1} p_k \times \log(1/p_k)\right)/\log(M-1), & \text{othwerwise} \end{cases}$$

where $$p_k = \frac{(coeff_k)^2}{\sum_{k=1}^{M-1}(coeff_k)^2},$$

and if p=0, p×log(1/p)=0; k is index of the DCT coefficients and k=0 refers to DC component; M is the size of DCT transform; T is a threshold ranging from 0 to 1, and set empirically according to dataset (it takes value 0.8 in our experiment). In H.264, the DCT transform can be of size 16×16 or 8×8 or 4×4. If the DCT transform is of size 8×8 (or 4×4), in one method, the above equation is applied to the 4 (or 16) basic DCT transform units of the MB individually, then the texturesmoothness of the MB is the average of the texturesmoothness values of the 4 (or 16) basic DCT transform units. In another method, for 4×4 DCT transform, 4×4 Hadamard transform is applied to the 16 4×4 arrays composed of the same components of the 16 basic 4×4 DCT coefficient units. For 8×8 DCT transform, Haar transform is applied to the 64 2×2 arrays composed of the same components of the 64 8×8 DCT coefficient units. Then 256 coefficients are obtained no matter what size of the DCT transform is used by the MB. Then use the above equation to calculate texturesmoothness of the MB. If a MB of Intra frame is lost, its texture smoothness equals the medium value of those of the neighbor MBs. If the lost MB has no neighbor MBs, its texture smoothness equals that of the collocated MB in previous frame.

For the inter predicted frame (P or B frame), if the motion activity of the current MB (e.g. the above defined spatial homogeneity, or, motion magnitude) equals zero or the MB has no prediction residual (e.g., skip mode, or DCT coefficients of prediction residual equal zero), then the texture smoothness of the MB equals that of the collocated MB in the previous frame. Otherwise, the texture smoothness of a correct MB is calculated according to the above-described smoothness calculation equation; and the texture smoothness of a lost MB is calculated as the medium value of those of neighbor MBs (if exist) or equals that of the collocated MB of the previous frame. The basic idea behind the above equation for texture smoothness is that, if the texture is smooth, most of the energy is concentrated at the DC component of the DCT coefficients; on the other hand, for the high-activity MB, the more textured the MB is, the more uniformly distributed to different AC components of DCT the energy of the MB is. The texture smoothness metric calculated according to above equation can also be used to apply texture masking effects to the visible artifacts detection.

Figure 5:
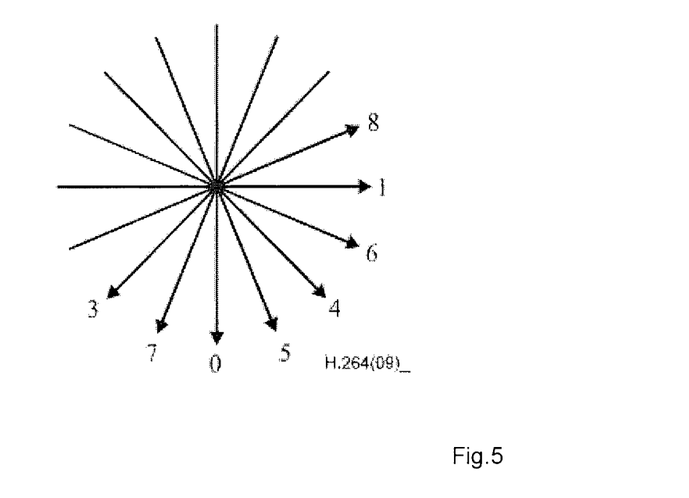
FIG. 5 intra_4×4 and Intra_8×8 prediction mode directions in H.264.

In another less complex and thus less accurate embodiment for the I_frame of H.264, there are eight types of directional intra-prediction modes, as shown in FIG. 5, plus one Intra_DC prediction mode for Intra_4×4 and intra_8×8 Intra MB. There are four prediction modes for Intra_16×16 MB, namely Vertical, Horizontal, DC and Plan. Therefore, the intra-prediction mode of its spatial neighbor MBs can be used directly to infer the smoothness of the lost MB. That is, $$texturesmoothness(n, i, j) = \frac{num. \text{ of } block_{4\times4} \text{ of DC mode} + num. \text{ of } block_{4\times4} \text{ of Vertical mode} + num. r \text{ of horizon mode}}{total \ num. \text{ of } block_{4\times4} \text{ within the neighbor } MBs}$$

(num.=number) The smaller the value of the texturesmoothness(n,i,j) is, the less visible will be the artifacts of the lost MB after error concealment, if the intra-pixel interpolation based EC method is used to recover the lost MB.

In one embodiment, the texture smoothness is obtained from DCT coefficients of at least adjacent MBs. In one embodiment, the texture smoothness is obtained from a comparison of the ratio of DC coefficient energy to the DC+AC coefficient energy with a threshold value (e.g. $E_{DC}/E_{DC+AC}$<thr?), and uses DCT coefficients of current MB and adjacent MBs.

In one embodiment, a probability determining unit calculates a probability of certain modes, such as inter_skip mode and/or inter_direct mode. These modes are special for H.264 coded bitstreams. Other coding formats may have other modes that can be used.

In one embodiment, the probability of inter_skip_mode is calculated, using the following method:

$$InterSkipModeRatio = \frac{\text{number of blocks of skip mode}}{\text{total number of blocks within the neighboring } MBs}$$

Skip mode in H.264 means that no further data is present for the MB in the bitstream. No matter if the MB is partitioned into smaller blocks or not, the blocks in the above equation refer to 4×4_sized_blocks of the neighboring MBs of the lost MB.

In one embodiment, the probability of inter_direct_mode is calculated, using the following method:

$$InterDirectModeRatio = \frac{\text{number of blocks of direct mode}}{\text{total number of blocks within the neighboring } MBs}$$

Direct mode in H.264 means that no MV differences or reference indices are present for the MB. No matter if the MB is partitioned into smaller blocks or not, the blocks in the above equation refer to 4×4_sized_blocks of the neighboring MBs of the lost MB.

The above two features InterSkipModeRatio and InterDirectModeRatio may be used together, e.g. in the form of summation. Generally, if a MB is predicted using skip mode or direct mode in H.264, its motion can be predicted well from the motion of its spatial or temporal neighbor MBs. Therefore, this type of MB, if lost, can be concealed with less visible artifacts, if temporal EC approaches are applied to recover the missing pixels.

In the following, subunits of the global feature determining units 130 are described, see FIG. 3. For each frame having one or more lost packets, four condition features are extracted in this embodiment.

The frame type determining subunit 131 determines the frame type. Possible frame types are intra-predicted frame or inter-predicted frame, which may be P-frames or B-frame.

$$FrameType = \begin{cases} \text{Intra Frame} \\ \text{Inter Frame} \end{cases}$$

If the frame is partially lost, the frame type information can be found by parsing the slice header of the received packet of the frame. If the frame is completely lost, the frame type can be inferred from the GOP structure of the sequence.

The intra-/inter ratio detection subunit 132 calculates the ratio of intra-predicted MBs to inter-predicted MBs within a frame.

$$RatioIntraMBs = \frac{\text{number of Intra } MBs}{\text{number of Inter } MBs + \text{number of Intra } MBs}$$

This feature is calculated for the frame that is partially lost and based on the MBs that are correctly received.

In the motion index determining subunit 133, the motion index is calculated for partially lost P- and/or B-frames (i.e. less than half of the frame is lost), using the motion vectors of the received MBs of the frame.

MotionIndex($n$)=average{|mv($n,i,j$)|,($i,j$)∈all received MBs of the frame}

For lost I-frames or other partially lost P-/B-frames (i.e. if more than half of the frame is lost), its motion index is calculated using the motion vectors of its adjacent P-frames or B-frames that are received correctly.

MotionIndex($n$)=average{|mv($n-1,i,j$)|,|mv($n+1,i,j$)| ($i,j$)∈all received MBs of the corresponding frame}

If the two adjacent frames are lost totally, then the MotionIndex parameter of the previous frame is used, i.e. MotionIndex($n$)=MotionIndex($n-1$). The larger the MotionIndex value is, the higher is the motion of the frame.

The texture index determining subunit 134 determines a texture index of a frame having lost MBs.

No matter if the frame is intra-predicted or inter-predicted, the texture index is calculated using the texture smoothness value of the interested MBs of the frame. In one embodiment, the interested MBs are those MBs adjacent to the lost MBs and the lost MBs themselves. The TextureIndex is calculated using the average of the texture smoothness value of the interested MBs as $$TextureIndex(n) = \frac{1}{K}\sum_{k=1}^{K} texturesmoothness(n,k)$$

where K is the total number of the interested MBs; k is the index of the interested MB. The larger the TextureIndex value is, the richer is the texture of the frame.

Finally, an EC effectiveness estimation unit 140 predicts a visible artifact level, wherein it emulates a known EC method. As described above, one challenge for bitstream-level VQM is to estimate the effectiveness of EC strategy employed at the decoder, because without real decoding, the visibility of the artifacts is unknown. At bitstream level, we can only estimate the artifacts level of the lost MBs after decoding with EC strategy. It is described above how to extract typical condition features and local content/coding features that are closely related to the effectiveness of the existing EC methods. Given that the decoder's EC strategy is known, the visible artifact level of a lost MB can be estimated using the extracted features by emulating the effectiveness of the EC method at bitstream level.

For example, assume in one embodiment of the EC effectiveness estimation unit 140 that the JM reference decoder is used. EC methods used by JM decoder are described above. The input video bitstream is parsed in encoding order. For each frame for which the lost MBs are detected during the parsing, condition features and local features are calculated, and then the visible artifacts level is rated for each (or at least for each lost) MB according to following steps:

If the frame is intra-predicted (i.e. the above-determined frame type is InfraFrame), the artifacts level is derived from the texture smoothness calculated above, according to artifactslevel($n,i,j$)=texturesmoothness($n,i,j$)×100

Else, if the frame is inter-predicted (i.e. if the above-determined frame type is InterFrame), the artifacts level is derived (in the case of higher computational complexity) from the spatial uniform parameters calculated above, according to $$\text{artifactslevel}(n, i, j) =$$
$$\frac{(\text{spatialuniformMV}_x(n, i, j) + \text{spatialuniformMV}_y(n, i, j)) \times 100}{2 \times \text{rangeofMVsearch}}$$

or (in cases of low computational complexity) according to artifactslevel($n,i,j$)=(1−InterSkipModeRatio−InterDirectModeRatio)×100

Both are equally well-suited.

Since in the JM decoder the motion vector of lost MB of inter-predicted frame is estimated using those of spatially neighboring MBs, the spatialuniformMV feature is used here to calculate the visible artifacts level of the lost MB. For other types of EC strategy, the temporaluniformMV feature and the averagemagnitudeMV feature may be better for predicting the visible artifacts level of the lost MB.

In another embodiment of the EC effectiveness estimation unit 140, assume the ffmpeg decoder is used. Here the EC strategy is more advanced than for the JM decoder. If an Intra frame has lost MBs, a value named isIntraMoreLike is calculated based on decoded pixels of current frame and the previous frame. If the parameter isIntraMoreLike>0, then spatial pixel interpolation based EC method is used. Otherwise, the temporal EC method is used. If an inter-predicted frame has lost MBs, the number of received intra-coded MBs is compared to the number of received inter-coded MBs. If the number of inter-coded MBs is higher than that of intra-coded MBs, the temporal EC method is used; otherwise, the spatial EC method is used.

Therefore, by emulating the process at the decoder, the visible artifacts level for each (or at least for each lost) MB is rated according to the following steps:

---

If (FrameType == Intra Frame) then set
$$\text{isSpatialEC} = a \times \frac{\text{motionIndex}(n)}{\text{rangeofMVsearch}} - \text{textureIndex}(n)$$
If (isSpatialEC > 0) then set
    artifactslevel(n, i, j) = texturesmoothness(n, i, j) × 100
else set
$$\text{artifactslevel}(n, i, j) = \frac{(\text{spatialuniformMV}_x(n, i, j) + \text{spatialuniformMV}_y(n, i, j)) \times 100}{2 \times \text{rangeofMVsearch}}$$
else (i.e., FrameType == Inter Frame)
  if (RatioIntraMBs > 1) then set
    artifactslevel(n, i, j) = texturesmoothness(n, i, j) × 100
  else set
$$\text{artifactslevel}(n, i, j) = \frac{(\text{spatialuniformMV}_x(n, i, j) + \text{spatialuniformMV}_y(n, i, j)) \times 100}{2 \times \text{rangeofMVsearch}}$$

---

Note that the above defined features may be used separately or in combination to predict a visible artifacts level of the lost MB after error concealment, depending on the pre-known EC strategy used in decoder.

In one embodiment, the invention relates to a computer readable medium having executable instructions to cause a computer to perform a method comprising steps of extracting and/or calculating a plurality of global condition features from a video bit-stream, determining that a MB is lost, extracting and/or calculating a plurality of local effectiveness features at least for the lost MB, calculating a numeric error concealment effectiveness level for each (or at least for each lost) MB by emulating an error concealment method that is used in said error concealment, and providing the calculated error concealment effectiveness level as an estimated visible artifacts level of video quality.

In the above, whenever features are extracted and/or calculated for each (or at least for each lost) MB, this may refer in one embodiment to only lost MBs, or in another embodiment additionally one or more correctly received MBs. As far as the present invention deals with channel artifacts, the artifacts level is calculated for each lost MB, since the artifacts level of correctly received MB is regarded as zero. Correspondingly, an EC effectiveness level is calculated for each lost MB. However, the features of correct MBs are used for estimating the features of lost MBs. So, in one embodiment, for simplification of the algorithm and convenience of programming of software implementations, the proposed local features are calculated for each MB (i.e. lost and correct). This has the advantage that the features of correct MBs are readily available when necessary.

The invention can be used generally for the field of video quality assessment, particularly in receivers, decoders etc., or in network elements like routers etc. It will be understood that the present invention has been described purely by way of example, and modifications of detail can be made without departing from the scope of the invention. While there has been shown, described, and pointed out fundamental novel features of the present invention as applied to preferred embodiments thereof, it will be understood that various omissions and substitutions and changes in the device and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated. Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

CITED REFERENCES

H. Rui, C. Li, and S. Qiu: "Evaluation of packet loss impairment on streaming video", J. Zhejiang Univ.-Sci. A, Vol. 7, pp. 131-136 (January 2006)

T. Yamada, Y. Miyamoto, and M. Serizawa: "No-reference video quality estimation based on error-concealment effectiveness", Packet Video, 288-293, (2007)

A. R. Reibman, V. A. Vaishampayan and Y. Sermadevi: "Quality monitoring of video over a packet network", IEEE Transactions on Multimedia, 6(2), 327-334, (2004)

The invention claimed is:

1. A method for estimating video quality on a bit-stream level, the video quality being an estimated quality of a decoded video after error concealment and the method being performed by a computer on the bit-stream level before said error concealment, the method comprising:

at least one of extracting and calculating a plurality of global condition features from a video bit-stream, wherein the global condition features comprise at least two of a frame type, a ratio of intra-macroblocks versus inter-macroblocks, a motion index and a texture index, wherein the motion index is an average length of received motion vectors of a frame, and wherein the texture index is obtained from texture smoothness values of interested macroblocks of the frame;

determining that a macroblock is lost;

at least one of extracting and calculating a plurality of local effectiveness features for the lost macroblock, wherein the local effectiveness features comprise at least two of a spatial motion vector homogeneity, a temporal motion vector uniformity, and a macroblock texture smoothness;

calculating a numeric error concealment level for the lost macroblock based on the plurality of global condition features and the plurality of local effectiveness features by emulating an error concealment method that is used in said error concealment; and providing the calculated error concealment level as an indication of said video quality.

2. The method according to claim 1, wherein the plurality of global condition features comprise at least the frame type, the ratio of intra-macroblock versus inter-macroblock, the motion index and the texture index.

3. The method according to claim 1, wherein the interested macroblocks comprise the lost macroblocks and macroblocks adjacent to the lost macroblocks and wherein the macroblock texture smoothness is obtained from a comparison of the ratio of DC coefficient energy to the accumulated energy of DC and AC coefficients with a threshold value according to:

$$texturesmoothness(n, i, j) =$$

$$\begin{cases} 0, & \text{if } \frac{(coeff_0)^2}{\sum_{k=0}^{M-1}(coeff_k)^2} > T, \text{ or, } \sum_{k=0}^{M-1}(coeff_k)^2 = 0 \\ \left(\sum_{k=1}^{M-1} p_k \times \log(1/p_k)\right) / \log(M-1), & \text{othwerwise} \end{cases}$$

wherein $$p_k = \frac{(coeff_k)^2}{\sum_{k=1}^{M}(coeff_k)^2},$$

k is a DCT coefficient index, M is the size of a DCT transform, and T is a threshold in the range [0, ..., 1].

4. The method according to claim 1, wherein the spatial motion vector homogeneity is a measure of a uniformity of motion vectors of macroblocks that are spatially adjacent to the lost macroblock, the temporal motion vector uniformity is a measure of a uniformity of motion vectors of macroblocks collocated and temporally adjacent to the lost macroblock and the texture smoothness is a measure of a uniformity of DCT coefficients in spatially or temporally adjacent macroblocks.

5. The method according to claim 1, wherein the plurality of local effectiveness features comprise at least the spatial motion vector homogeneity, the temporal motion vector uniformity, an average motion magnitude, and the macroblock texture smoothness.

6. The method according to claim 1, wherein the spatial motion vector homogeneity is calculated based on a variance of motion vectors of adjacent correct macroblocks, separately for a horizontal and a vertical direction.

7. The method according to claim 1, wherein the macroblock texture smoothness is obtained from a comparison of the ratio of DC coefficient energy to the accumulated DC and AC energy with a threshold value, and is based on DCT coefficients of a current macroblock and adjacent macroblocks.

8. The method according to claim 1, wherein H.264 encoding is used and the plurality of local effectiveness features comprise at least one of an inter-skip mode ratio and an inter-direct mode ratio.

9. A non-transitory computer readable medium having executable instructions to cause a computer to perform a method for estimating video quality on a bit-stream level, the video quality being an estimated quality of a decoded video after error concealment and the method being performed by a computer on the bit-stream level before said error concealment, the method comprising:

at least one of extracting and calculating a plurality of global condition features from a video bit-stream, wherein the global condition features comprise at least two of a frame type, a ratio of intra-macroblocks versus inter-macroblocks, a motion index and a texture index, wherein the motion index is an average length of received motion vectors of a frame, and wherein the texture index is obtained from texture smoothness values of interested macroblocks of the frame;

determining that a macroblock is lost;

at least one of extracting and calculating a plurality of local effectiveness features for the lost macroblock, wherein the local effectiveness features comprise at least two of a spatial motion vector homogeneity, a temporal motion vector uniformity, and a macroblock texture smoothness;

calculating a numeric error concealment level for the lost macroblock based on the plurality of global condition features and the plurality of local effectiveness features by emulating an error concealment method that is used in said error concealment; and providing the calculated error concealment level as an indication of said video quality.

10. The medium according to claim 9, wherein the plurality of global condition features comprise at least the frame type, the ratio of intra-macroblock versus inter-macroblock, the motion index, and the texture index.

11. The medium according to claim 9, wherein the interested macroblocks comprise the lost macroblocks and macroblocks adjacent to the lost macroblocks, and wherein the macroblock texture smoothness is obtained from a comparison of the ratio of DC coefficient energy to the accumulated energy of DC and AC coefficients with a threshold value according to:

$$texturesmoothness(n, i, j) = \begin{cases} 0, & \text{if } \frac{(coeff_0)^2}{\sum_{k=0}^{M-1}(coeff_k)^2} > T, \text{ or, } \sum_{k=0}^{M-1}(coeff_k)^2 = 0 \\ \left(\sum_{k=1}^{M-1} p_k \times \log(1/p_k)\right) / \log(M-1), & \text{othwerwise} \end{cases}$$

wherein $$p_k = \frac{(coeff_k)^2}{\sum_{k=1}^{M}(coeff_k)^2},$$

k is a DCT coefficient index, M is the size of a DCT transform, and T is a threshold in the range [0, . . . , 1].

12. The medium according to claim 9, wherein the spatial motion vector homogeneity is a measure of a uniformity of motion vectors of macroblocks that are spatially adjacent to the lost macroblock, the temporal motion vector uniformity is a measure of a uniformity of motion vectors of macroblocks collocated and temporally adjacent to the lost macroblock and the texture smoothness is a measure of a uniformity of DCT coefficients in spatially or temporally adjacent macroblocks.

13. The medium according to claim 9, wherein the plurality of local effectiveness features comprise at least the spatial motion vector homogeneity, the temporal motion vector uniformity, an average motion magnitude, and the macroblock texture smoothness.

14. The medium according to claim 9, wherein the spatial motion vector homogeneity is calculated based on a variance of motion vectors of adjacent correct macroblocks, separately for a horizontal and a vertical direction.

15. The medium according to claim 9, wherein the macroblock texture smoothness is obtained from a comparison of the ratio of DC coefficient energy to the accumulated DC and AC energy with a threshold value, and is based on DCT coefficients of a current macroblock and adjacent macroblocks.

16. The medium according to claim 9, wherein H.264 encoding is used and the plurality of local effectiveness features comprise at least one of an inter-skip mode ratio and an inter-direct mode ratio.

17. A device for estimating video quality on a bit-stream level, the video quality being estimated on the bit-stream level before error concealment and the video quality being an estimated quality of a decoded video after error concealment, the device comprising a processor and a memory, the memory being adapted for storing instructions that when executed on the processor perform a method of:
  at least one of extracting and calculating a plurality of global condition features from a video bit-stream, wherein the global condition features comprise at least two of a frame type, a ratio of intra-macroblocks versus inter-macroblocks, a motion index and a texture index, wherein the motion index is an average length of received motion vectors of a frame, and wherein the texture index is obtained from texture smoothness values of interested macroblocks of the frame;
  determining that a macroblock is lost;
  at least one of extracting and calculating a plurality of local effectiveness features for the lost macroblock, wherein the local effectiveness features comprise at least two of a spatial motion vector homogeneity, a temporal motion vector uniformity, and a macroblock texture smoothness;
  calculating a numeric error concealment level for the lost macroblock based on the plurality of global condition features and the plurality of local effectiveness features by emulating an error concealment method that is used in said error concealment; and
  providing the calculated error concealment level as an indication of said video quality.

18. The device according to claim 17, wherein the plurality of global condition features comprise at least the frame type, the ratio of intra-macroblock versus inter-macroblock, the motion index, and the texture index.

19. The device according to claim 17, wherein the interested macroblocks comprise the lost macroblocks and macroblocks adjacent to the lost macroblocks, and wherein the macroblock texture smoothness is obtained from a comparison of the ratio of DC coefficient energy to the accumulated energy of DC and AC coefficients with a threshold value according to:

$$texturesmoothness(n, i, j) = \begin{cases} 0, & \text{if } \frac{(coeff_0)^2}{\sum_{k=0}^{M-1}(coeff_k)^2} > T, \text{ or, } \sum_{k=0}^{M-1}(coeff_k)^2 = 0 \\ \left(\sum_{k=1}^{M-1} p_k \times \log(1/p_k)\right) / \log(M-1), & \text{othwerwise} \end{cases}$$

wherein $$p_k = \frac{(coeff_k)^2}{\sum_{k=1}^{M}(coeff_k)^2},$$

k is a DCT coefficient index, M is the size of a DCT transform, and T is a threshold in the range [0, . . . , 1].

20. The device according to claim 17, wherein the spatial motion vector homogeneity is a measure of a uniformity of motion vectors of macroblocks that are spatially adjacent to the lost macroblock, the temporal motion vector uniformity is a measure of a uniformity of motion vectors of macroblocks collocated and temporally adjacent to the lost macroblock and the texture smoothness is a measure of a uniformity of DCT coefficients in spatially or temporally adjacent macroblocks.

21. The device according to claim 17, wherein the plurality of local effectiveness features comprise at least the spatial motion vector homogeneity, the temporal motion vector uniformity, an average motion magnitude, and the macroblock texture smoothness.

22. The device according to claim 17, wherein the spatial motion vector homogeneity is calculated based on a variance of motion vectors of adjacent correct macroblocks, separately for a horizontal and a vertical direction.

23. The device according to claim 17, wherein the macroblock texture smoothness is obtained from a comparison of the ratio of DC coefficient energy to the accumulated DC and AC energy with a threshold value, and is based on DCT coefficients of a current macroblock and adjacent macroblocks.

24. The device according to claim 17, wherein H.264 encoding is used and the plurality of local effectiveness features comprise at least one of an inter-skip mode ratio and an inter-direct mode ratio.

25. The device according to claim 17, wherein the plurality of local effectiveness features comprise at least one of an inter-skip mode ratio and an inter-direct mode ratio, wherein the inter-skip mode ratio is a ratio of skip mode blocks to blocks within macroblocks adjacent thereto, and the inter-direct mode ratio is a ratio of direct mode blocks to blocks within macroblocks adjacent thereto, wherein a skip mode block is a block in a macroblock for which no further data are present in the bitstream and a direct mode block is a block in a macroblock for which no motion vector differences or reference indices are present in the bitstream.

26. The method according to claim 1, wherein the plurality of local effectiveness features comprise at least one of an inter-skip mode ratio and an inter-direct mode ratio, wherein the inter-skip mode ratio is a ratio of skip mode blocks to blocks within macroblocks adjacent thereto, and the inter-direct mode ratio is a ratio of direct mode blocks to blocks within macroblocks adjacent thereto, wherein a skip mode block is a block in a macroblock for which no further data are present in the bitstream and a direct mode block is a block in a macroblock for which no motion vector differences or reference indices are present in the bitstream.

* * * * *